Oct. 28, 1969  H. C. KLEIN  3,475,059

BRAKE-FORCE REGULATOR SYSTEM

Filed April 9, 1968  2 Sheets-Sheet 1

INVENTOR:
Hans-Christof Klein
BY
Karl G. Ross
Attorney

Oct. 28, 1969    H. C. KLEIN    3,475,059
BRAKE-FORCE REGULATOR SYSTEM
Filed April 9, 1968    2 Sheets-Sheet 2

Hans-Christof Klein
INVENTOR.

BY

Karl G. Ross
Attorney

United States Patent Office 3,475,059
Patented Oct. 28, 1969

3,475,059
BRAKE-FORCE REGULATOR SYSTEM
Hans Christof Klein, Hattersheim (Main), Germany, assignor to Alfred Teves G.m.b.H., Frankfurt am Main, Germany, a corporation of Germany
Filed Apr. 9, 1968, Ser. No. 719,886
Claims priority, application Germany, Apr. 28, 1967, T 33,748
Int. Cl. B60t 8/18, 13/00
U.S. Cl. 303—22    6 Claims

ABSTRACT OF THE DISCLOSURE

A brake-force regulator of an automotive vehicle and the fluid-pressure-responsive element of an automatically leveling shock absorber are connected via an intermediate piston-cylinder arrangement to provide instantaneous feedback for the adjustment of the braking force in proportion to the load.

---

The present invention relates to a brake-force regulator or distributor for automotive vehicles whose response to a load is proportional to the fluid pressure arising from the leveling action of an automatically leveling suspension system.

Load-responsive brake force regulators which are coupled to the suspension are described in commonly owned Patents No. 3,167,360, No. 3,169,800 and No. 3,233,947 issued respectively on Jan . 26, 1965, Feb. 16, 1965 and Feb. 8, 1966. These regulators include generally a differential piston exposed to the fluid pressure of the brake master cylinder and which operates a valve in the hydraulic line between the master cylinder and the wheel brake cylinder to vary the effective pressure transmission on opposite sides of the valve, resilient means biasing the valve against the differential piston; a linkage is provided between the control piston assembly and the suspension system of the vehicle, e.g. shock absorbers which interconnect the vehicle chassis and axles.

The feedback provided by the shock absorber springs in an arrangement of this type imposes considerable rigidity on the system since the springs, pre-stressed in respect of a predetermined load factor do not readily adapt to variations thereof. Moreover, the linkage requires complicated construction involving lever arms and spring assemblies which must be precisely positioned for the required effectiveness, and to avoid the risk of valve and/or piston jamming.

It is the principal object of my invention to obviate the drawbacks of prior art and to provide a load-responsive brake force regulator which is simple, dependable and makes use of a minimum number of parts.

Another object is to provide this brake force regulator at very low cost.

A further object is to provide an improved brake force regulator which can easily be installed in pre-existing brake systems of essentially any hydraulic type.

These objects and others which will become apparent hereinafter are attained, in accordance with the present invention, by providing, in the connecting link between the brake force regulator and the shock absorber systems, an isolating piston which is exposed, on one side, to the fluid pressure of the hydraulic brake system and, on the other, to the fluid pressure of a self-leveling hydraulic or hydropneumatic shock absorber or suspension assembly. The isolating piston, adapted to shift axially in an appropriate piston housing is thus displaceable in response to the relative forces and automatically produces an increase or a decrease in the braking force corresponding to the pressure applied by the load to the shock absorber fluid.

In commonly owned Patent No. 3,353,813 there is described a shock absorber assembly having resilient means reinforced by supplemental fluid-pressure-responsive means which are adapted to reinforce the restoring action of the associated springs. An increase in the load, transformed into hydraulic pressure of the fluid in a hydraulic cylinder at the upper extremity of the dash-pot assembly displaces the cylinder in a downward direction and compresses the biased springs to which it is coupled. This downward movement, is proportioned to the pressure in the hydraulic cylinder which, according to this invention, acts as a face of the isolating piston (or equivalent force-transmitting means) which is opposite to that exposed to the brake fluid pressure of the regulator.

In the preferred embodiment of my invention the regulator piston is abuttingly engageable with one end of a piston rod protruding out of the regulator housing which terminates, at its opposite end, in an isolating piston axially slidable in a mating piston housing. The piston housing communicates directly with the fluid-pressure chamber of the elongated shock absorber or suspension system. Alternately, an additional hydraulic piston element in a cylindrical housing may be interposed between the regulator housing and the rod of the isolating piston for an intermediate feedback means.

According to a specific feature of this invention, the self-leveling suspension, which readjusts the stiffness of the suspension in accordance with the vehicle load and may include the fluid-pressure chamber mentioned earlier, comprises an elongated suspension member whose housing is formed with a flange or other fitting to which a pressure connection can be made for coupling the fluid-pressure chamber with the regulator, preferably via a separating or isolating system as mentioned earlier. The pressure transmission may be direct or indirect, depending upon the convenience in attaching the regulator unit to the suspension. Thus, the isolating system may be shiftable in a cylinder which can be bolted or otherwise connected directly to the suspension member and is also connected to the regulator housing. Alternatively, the isolating piston may be a so-called floating piston which is shiftable in a cylinder mounted directly upon the suspension member in communication with its fluid chamber and connected via a fluid-transmission line with an output cylinder whose piston, in turn, acts upon the regulator plunger. A further desirable arrangement makes use of a conventional pressure coupling engageable with a fitting mounted directly on the suspension for transmitting fluid pressure to the output cylinder; the latter may be mounted on or close to the regulator and at a location remote from the suspension. In each case, the isolating piston or equivalent fluid linkage separates the gas or hydraulic compartment of the suspension member from the brake fluid or the regulator and provides a convenient means of force-transmission to bias the differential piston of the regulator in the absence of other spring or resilient means. The system is especially effective when the shock absorber or suspension arrangement is of the preloaded hydraulic-pneumatic type in which a gas head is maintained (see my commonly assigned Patent No. 3,323,810 issued June 11, 1965).

The above and other objects, features and advantages of my invention will become more readily apparent from the following description, reference being made to the accompanying drawing in which.

Figure 1:
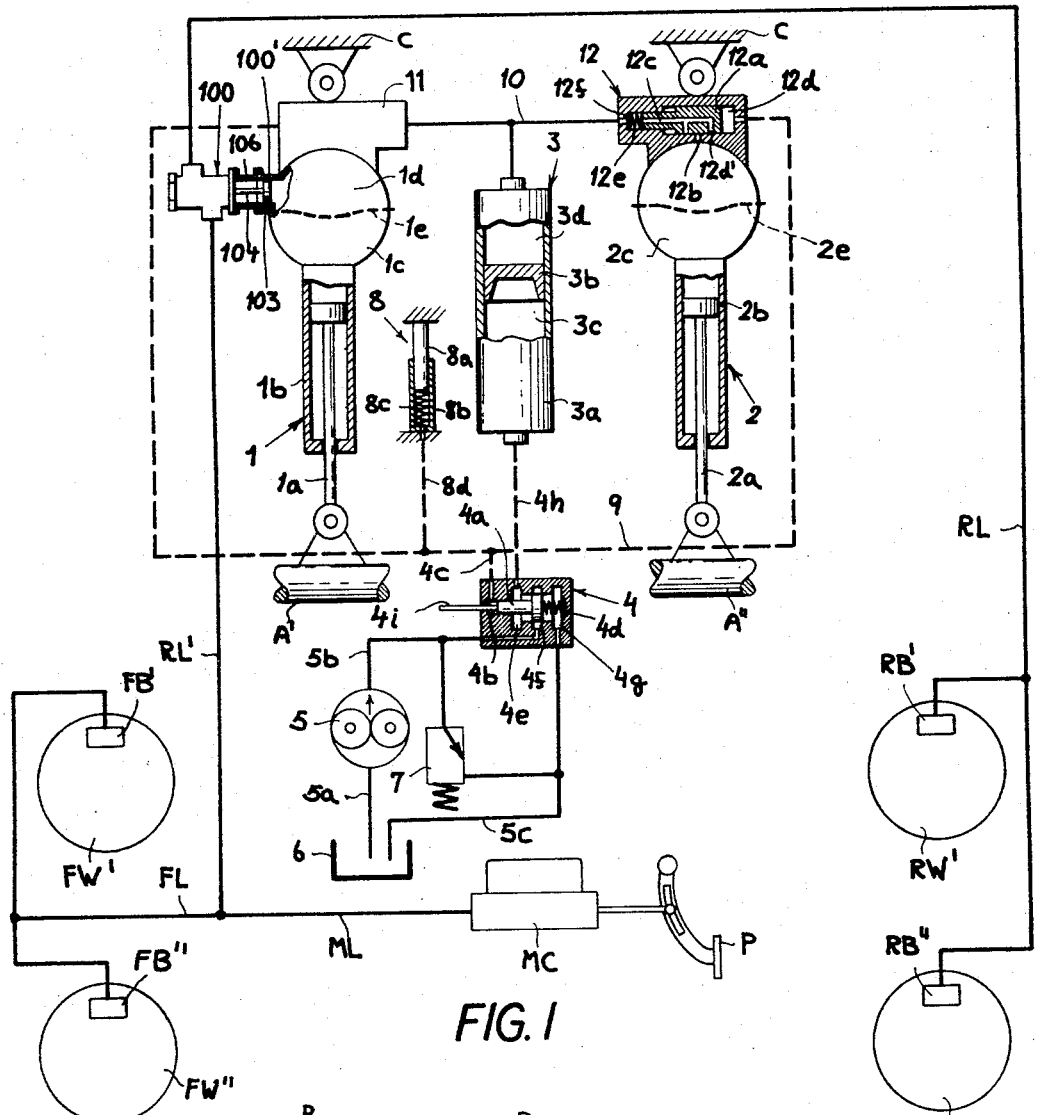
FIG. 1 is a diagrammatic view of a brake force regulator used in conjunction with a hydraulic-pneumatic vehicle suspension in accordance with this invention.

In FIG. 1 of the drawing, I show a hydraulic pneumatic vehicle suspension of the type described and claimed in my U.S. Patent No. 3,323,810 which includes a pair of hydraulic pneumatic load-leveling devices 1 and 2 connected between the vehicle chassis or body C and respective axles A' and A" of the rear wheels of the vehicle. The rear wheels are designated by RW' and RW" in FIG. 1 and are shown to have rear-wheel brakes RB' and RB", respectively. A hydraulic line RL conducts brake fluid from the regulator 100 (see FIG. 4) to the rear-wheel brakes RB' and RB".

The brake master cylinder MC is actuated by the brake pedal P and delivers fluid from the main line ML to a transmission line FL feeding the front-wheel brakes FB' and FB" of the front wheels FW' and FW". A further hydraulic line RL' delivers the brake fluid to the regulator 100 from line ML.

The load-leveling devices are of the telescopically extensible type and each includes a respective piston 1a, 2a longitudinally shiftable in a cylinder 1b, 2b of the load-leveling device. The liquid compartments 1c and 2c are separated from the gas compartments by respective force-transmitting diaphragms 1e and 2e fully described in the last mentioned patent.

This system also comprises a hydraulic pneumatic accumulator generally designated at 3, whose cylinder 3a receives a longitudinally reciprocable floating piston 3b which subdivides the cylinder 3a into a hydraulic side or chamber 3c and a gas side or chamber 3d; these chambers are of variable volume with volumes depending, of course, upon the position of the floating piston 3b. The liquid or hydraulic chamber 3c or cylinder 3a is energized by a positive-displacement hydraulic pump 5 via a valve whose function will be described below in greater detail. Pump 5 draws hydraulic fluid from a reservoir 6 via an inlet line 5a and discharges the fluid under pressure to the valve 4 via an outlet line 5b. A pressure-relief valve 7, designed to prevent straining of the pump with the valve 4 is closed, connects the line 5b with the return line 5c leading to the reservoir. Valve 4 is provided with a pressure-responsive valve member whose surface 4b forms a piston energizable by fluid pressure from line 4c which, in turn, receives fluid pressure from the control or regulated line. Valve member 4a is longitudinally shiftable against the force of a restoring spring 4d and, in its extreme lefthand position, communicates between the inlet compartment 4f of the valve and the return compartment 4g with which line 5c is connected. In its extreme righthand position, the valve member 4a permits communication between the inlet 4f and the outlet 4e, the latter feeding a line 4h which, in turn, supplies hydraulic fluid to the chamber 3c of the accumulator 3. Inlet 4f is connected with the high pressure line 5b.

Each of the load-leveling device 1, 2 is provided with a respective fluid-operated valve 11, 12 serving to admit air or other gas from chamber 3d into the compartment 1d, 2d of the respective load-leveling device via a line 10 and, consequently, to control the regulator 100 as will be described in greater detail hereinafter. The valves 11 and 12 may each comprise a fluid-pressure-responsive valve member 12a which normally blocks the outlet 12b into the chamber 1d or 2d, but is provided with a throughgoing bore 12c communicating between chambers 12d' and 12e of the valve. Chamber 12d thereof is fed with a control fluid via the line 9 to displace the member 12a against the spring 12f. When the valve member 12a (FIG. 1) is shifted toward the left as a result of an increase in pressure in line 9, passage 12c opens into an outlet 12b and the fluid is permitted to flow between the line 10 and the compartment 1d, 2d of the load-leveling device.

This suspension system includes a sensing device 8 interposed between any of the relatively displaceable parts of the chassis or axle so as to yield an indication of relative displacement between them to an off-normal position. This device can include a piston 8a slidable in a cylinder 8b in the manner of a conventional shock absorber while a compression spring 8c resists the downward displacement of the piston 8a into the cylinder 8b. The latter is connected via a line 8d with the control line 9 previously mentioned.

The adjustment of the desired level of the vehicle body above the axle is effected by precharging the accumulator 3 with hydraulic pressure from the source 5 by, for example, manual actuation of the stem 4i of the valve member 4a. When subsequent loading of the vehicle occurs, there is a telescopic displacement of the piston 8a into the cylinder 8b with an increase fluid pressure at line 8d, 9 and 4c. The valve member 4a is shifted to the right against the force of spring 4d to permit fluid flow from the pressure line 5b of pump 5 into the hydraulic chamber 3c of the accumulator. Since there is now an instantaneous imbalance of the pressure within chamber 3c and that within chamber 3d, piston 3b is shifted upwardly to compress the gas in chamber 3d. Concurrently, the pressure in line 9 operates the valves 11 and 12 to allow gas to flow into the compartments 1d and 2d. These cylinders 1 and 2 are thus loaded at a pressure determined by the vehicle load to force the pistons 1a and 2a downwardly relative to the chassis C and lift the vehicle body to counteract the telescoping action resulting from the loading of the vehicle. Otherwise, this system operates as described in my Patent No. 3,323,810.

In accordance with the principles of the present invention the suspension devices (illustrated with respect to the device 1) may be provided with a flange fitting 100' which may be closed when no brake regulator is employed but which is shown to be provided with a cylinder 106 bolted directly to the regulator 100 and receiving a floating piston 103 which acts directly against the stem 104 of the regulator 100. As the pressure rises in chamber 1d, therefore, a similar pressure increase urges the piston 103 and the plunger 104 to the left to raise the inflection point with respect to the brake force.

Figure 4:
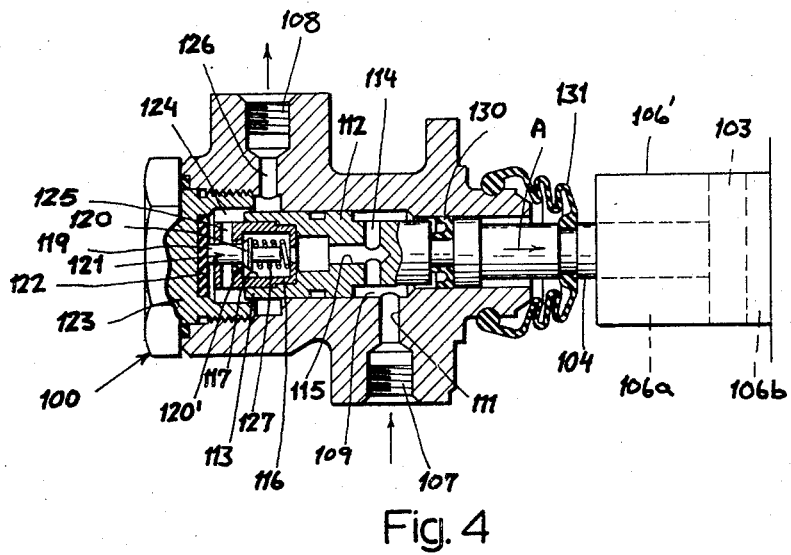
FIG. 4 is an axial cross sectional view, in part sectional, of a control piston-valve assembly incorporated in the diagrams of FIGS. 1–3.

The brake regulator body 100, shown in the drawing and particularly in FIG. 4, is provided with an inlet port 107 for the admission of brake fluid from the master cylinder MC. The brake fluid flows into the body 100 when the brake pedal 8, pivotally mounted on the motor vehicle chassis C, is depressed.

The inlet port 107 communicates with an annular first chamber 109 of the regulator bore 110 via radial passage 111. The bore 110 receives a differential piston 112 whose head 113 slidably engages the wall of bore 110.

The piston 112 is provided with radial bores 114 communicating with the first chamber 109 and opening into a central passage 115 which extends axially into the head 113 of the piston 112 and delivers the brake fluid to a second chamber 124. At the terminus of the bore 115 there is provided a cap 116 which forms an axial compartment 117 and a valve seat 120' for an axially displaceable valve member 121 adapted selectively to block or unblock the passage leading out of the cap 116 into the passageway 114 and 115. The valve member 121 is formed with an annular shoulder 120 engageable with the valve seat 120'. Valve member 121 is also provided with a stud 119 extending through the cap with peripheral clearance and abuttingly engageable with the juxtaposed wall 122 of the plug 123 forming part of the regulator body 100. The abutment means 122 constitutes, with the differential piston 112, the second chamber 124 into which the fluid can pass around the stud 119 and the channel 125. From the chamber 124 the fluid flows via a radial bore 126 and the outlet 108, to the brake cylinders of the rear-wheel brakes.

As indicated earlier the brake-force regulator 100 operates generally as described in U.S. Patents Nos. 3,167,360, 3,169,800 and 3,233,947 and can be used either to diminish the rate of pressure increase in the wheel brakes and to prevent skidding or to control the distribution of the brake pressure to the front and rear-wheel brakes as described in these parts. Thus, when the brake pedal P is depressed substantially identical pressures are delivered to the wheel brake cylinders of the front brakes FB' and FB" and to the rear brakes RB' and RB"; under these conditions the differential piston or plunger 112 is at its lefthand extreme position illustrated in FIG. 4. In this position, the valve member 121 is held by the abutment 122 against the spring 127 to the right, relative to the differential piston. Brake fluid flows from the inlet 107 through the radial bore 111 into compartment 109 and thence via the radial bores 114 to an axial passage 115 of the differential piston into the check-valve chamber 117 and past the frustoconical seat 120 of the valve member 121 to the radial bores 125 and the chamber 124.

Figure 1A:
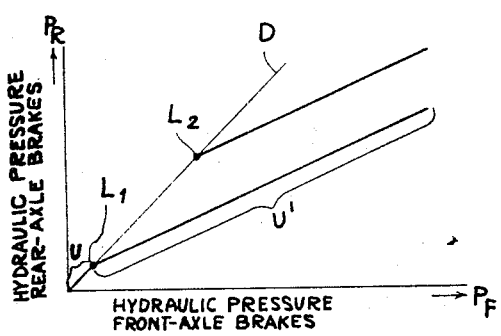
FIG. 1A is a graph of the pressure relationships of this system.

From chamber 124 the brake fluid flows via radial bore 126 and outlet 108 to the line RL and the rear-wheel brakes RB' and RB". This uniform distribution of pressure to the front- and rear-wheel brakes is represented by the dot-dash line D in FIG. 1A. In this figure, I have plotted the hydraulic pressure $P_R$ of the rear-wheel brakes along the ordinate against the hydraulic pressure $P_F$ of the front-wheel brakes along the abscissa. A uniform distribution occurs during the stretch U of the graph terminating at an inflection point $L_1$. At this inflection point, the differential pressure applied across the head 113 of piston 112 causes the latter to move in the direction of arrow A against the force applied to the piston 103 via the stem 104 of the differential piston. At the point $L_1$ the frustoconical portion 120 engages the valve seat 120' so that further pressure transfer between the chamber 109 and the chamber 124 is effected in inverse relationship to the effective areas of the piston 112 exposed to the fluid in these chambers. The pressure at the rear-axle brakes thus rises at a slower rate than the pressure at the front-axle brakes as represented by the stretch U' of the graph. When, however, an increase load is applied to the vehicle chassis, the pressure behind the piston 103 and generated in the chamber $1d$ is increased. Accordingly, a higher pressure differential (corresponding to point $L_2$) must be reached before the valve 120, 120' closes.

The isolating piston 103 of FIG. 1 and FIG. 4 is attached to the stem 104 protruding out of the body 100 and integral with the piston 112. The stem 104 is provided with a flanged seal 130 and is axially movable in the cylindrical housing 106, 106' in the direction of the arrow A.

The piston 103 also subdivides the housing 106 or 106' into two non-communicating chambers 106a and 106b, each of which is of variable volume relative to the other. Chamber 106b is exposed to the pressure of the suspension fluid quantity of which fluid provides the resilient bias for the piston assembly in the regulator housing 100. In the system of FIG. 4, the cylinder 106' is attached directly to the flanges of the suspension device but is spaced from the valve body 100; a cuff 131 is used to prevent contamination of the regulator.

Figure 2:
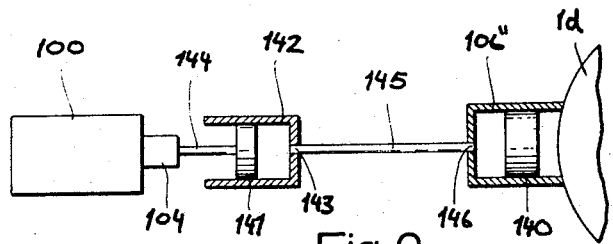
FIG. 2 is a diagrammatic view of another embodiment of the subject of my invention.

According to the embodiment of my invention shown in FIG. 2, the rod 104 protrudes out of the regulator body 100 and is connected, via the piston rod 144, with the piston 141 which is slidably received in the cylinder 142. An outlet port 143 in the wall of the cylinder 142, opposite the piston rod 141, communicates with the conduit 145 which leads, via the aperture 146, to the cylinder 106" housing the isolating piston 140. The cylinder 106" is attached directly to the suspension device.

Figure 3:
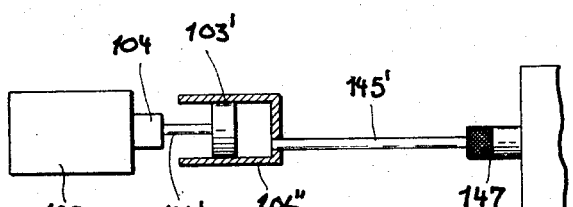
FIG. 3 is a diagrammatic view of yet another embodiment of the brake force regulator according to my invention.

In FIG. 3, the stem 104, protruding out of the regulator housing 100, is connected to the piston rod 144' which carries the piston 103'. The piston 103' is axially slidable in the hydraulic cylinder 106" which may be mounted on the regulator and is formed with a port in the wall opposite that through which the piston rod 144 is admitted. The port communicates with a conduit 145' and, through the latter, with the releasable pressure coupling 147 which provides for the through-flow of fluid from the pressure chamber of the shock absorber or suspension system. When the coupling is detached, escape of pressure from chamber $1d$ is prevented.

The invention described and illustrated is believed to admit of many modifications within the ability of persons skilled in the art.

I claim:

1. A brake-regulator system for an automotive vehicle having a chassis, at least one axle, and a suspension connecting said axle with said chassis, a hydraulic master cylinder for displacing brake liquid and at least one wheel brake hydraulically actuatable by said master cylinder, said system comprising braking-force-regulating hydraulic valve means interposed between said hydraulic master cylinder and said wheel brake and having a valve plunger shiftable under hydraulic brake pressure to alter the rate of hydraulic pressure increases in said wheel brake with operation of said hydraulic master cylinder; a fluid-pressure-operated chassis-leveling device forming part of said suspension and restoring the position of said chassis relative to said axle upon loading of the vehicle, said device having a housing forming at least one fluid chamber sustaining a fluid pressure generally proportional to the load on said chassis; and fluid-pressure transmitting means biased by the pressure in said chamber and operatively connected with said plunger for controlling same to vary the point at which the rate of hydraulic pressure built up in said wheel brake is diminished in accordance with the pressure in said chamber, said fluid-pressure transmitting means including a further fluid cylinder communicating at one side with said chamber and connected to said housing, and an isolating piston received in said further cylinder and acting at the other side of said further cylinder against said plunger while being subjected directly to the fluid pressure in said chamber.

2. The system defined in claim 1 wherein said plunger has a stem bearing directly against said isolating piston.

3. The system defined in claim 1 wherein said pressure-transmitting means further comprises a follower hydraulic cylinder hydraulically coupled with said further cylinder at said other side, said isolating piston separating the hydraulic fluid of said follower cylinder from the fluid in said chamber, and a follower piston hydraulically displaceable in said follower cylinder and acting upon said plunger.

4. The system defined in claim 1 wherein said chamber is formed with a tubular cylindrical fitting receiving said isolating piston and defining said further cylinder, said plunger extending into said fitting and engaging said isolating piston.

5. The system defined in claim 1 wherein said further cylinder is flanged to said chamber in piggy back connection with said device, said regulating valve being mounted upon said further cylinder.

6. The system defined in claim 1 wherein said pressure transmitting means comprises a pressure coupling connecting said chamber with said further cylinder.

References Cited

UNITED STATES PATENTS

| 3,018,139 | 1/1962 | Stelzer | 303—22 X |
| 3,393,946 | 7/1968 | Julow | 303—22 |

MILTON BUCHLER, Primary Examiner

JOHN J. McLAUGHLIN, Jr., Assistant Examiner

U.S. Cl. X.R.

188—195; 303—6